(12) United States Patent
Lee (10) Patent No.: US 10,479,951 B2
(45) Date of Patent: Nov. 19, 2019

(54) CATALYST FOR DESULFURIZATION, METHOD OF PREPARING THE SAME, AND DESULFURIZATION METHOD USING THE SAME

(71) Applicant: Cheol Lee, Cheongju-si (KR)

(72) Inventor: Cheol Lee, Cheongju-si (KR)

(*) Notice: Subject to any disclaimer, the term of this patent is extended or adjusted under 35 U.S.C. 154(b) by 0 days.

(21) Appl. No.: 16/117,619

(22) Filed: Aug. 30, 2018

(65) Prior Publication Data

US 2019/0085254 A1 Mar. 21, 2019

(30) Foreign Application Priority Data

Sep. 18, 2017 (KR) .................. 10-2017-0119810

(51) Int. Cl.
*C10L 9/10* (2006.01)
*C10L 10/02* (2006.01)
*F23J 7/00* (2006.01)

(52) U.S. Cl.
CPC ............. *C10L 9/10* (2013.01); *C10L 10/02* (2013.01); *F23J 7/00* (2013.01); *C10L 2230/04* (2013.01); *C10L 2290/24* (2013.01)

(58) Field of Classification Search
CPC ..... F23J 7/00; C10L 9/10; C10L 10/02; C10L 2230/04; C10L 2290/24; C10L 2200/0209; C10L 2200/0218; C10L 2200/0268; C10L 2200/024; C10L 2200/0222; C10L 2200/0272; C10L 2200/0213; C10L 2200/0236; C10L 2200/0231; C10L 10/00; C10L 2230/088; B01J 21/00; B01J 23/00; B01J 37/00; B01D 2251/90; B01D 2255/00; B01D 2257/302; B01D 2258/0283
See application file for complete search history.

(56) References Cited

U.S. PATENT DOCUMENTS 4,519,807 A * 5/1985 Nishino .................. C10L 9/10
201/17

FOREIGN PATENT DOCUMENTS

| KR | 10-2006-0081654 A | 7/2006 |
| KR | 10-2009-0013116 A | 2/2009 |
| KR | 10-2012-00490 A | 5/2012 |
| KR | 10-1709864 B1 | 2/2017 |
| KR | 1906760 B1 * | 10/2018 ...... C10L 2200/0209 |

* cited by examiner

*Primary Examiner* — Timothy C Vanoy
(74) *Attorney, Agent, or Firm* — Lucas & Mercanti, LLP (57) ABSTRACT

Disclosed is a catalyst for desulfurization, including (a) an oxide selected from among $SiO_2$, $Al_2O_3$, $Fe_2O_3$, $TiO_2$, MgO, MnO, CaO, $Na_2O$, $K_2O$ and $P_2O_5$, (b) a metal selected from among Li, Cr, Co, Ni, Cu, Zn, Ga, Sr, Cd and Pb, and (c) a liquid compound selected from among sodium tetraborate ($Na_2B_4O_7 \cdot 10H_2O$), sodium hydroxide (NaOH), sodium silicate ($Na_2SiO_3$) and hydrogen peroxide ($H_2O_2$). The catalyst of the invention has a 2:1 type layered structure in which one octahedral layer is interposed between two tetrahedral layers and which has a net negative charge due to occupation of only two of three positively charged sites in the octahedral layer, and the catalyst for desulfurization is provided in the form of a metal chelate compound through chelation with a metal ion, whereby sulfur oxide ($SO_x$) can be adsorbed and removed at high efficiency upon combustion of a combustible substance.

13 Claims, 3 Drawing Sheets

CATALYST FOR DESULFURIZATION, METHOD OF PREPARING THE SAME, AND DESULFURIZATION METHOD USING THE SAME

CROSS-REFERENCE TO RELATED APPLICATION

This application claims the benefit of Korean Patent Application No. 10-2017-0119810, filed Sep. 18, 2017, the contents of which are incorporated herein by reference.

FIELD OF THE INVENTION

The present invention relates to a catalyst for desulfurization, a method of preparing the same, and a desulfurization method using the same. More particularly, the present invention relates to a catalyst for desulfurization having desulfurization activity, which is used to reduce emission of sulfur oxide ($SO_x$) upon combustion of a combustible substance, and to a method of preparing the same and a desulfurization method using the same.

BACKGROUND OF THE INVENTION

Sulfur oxide ($SO_x$) and nitrogen oxide ($NO_x$) are noted pollutants that cause air pollution. In particular, sulfur oxide is present in industrial exhaust gas emitted upon combustion of fossil fuels containing sulfur, thus causing various forms of environmental pollution, such as acid rain and the like.

Desulfurization methods for removing sulfur oxide from such industrial exhaust gas have been continuously studied, and flue gas desulfurization methods, which are post-combustion desulfurization methods, are typically used in factories and fossil-fuel-based power plants.

Flue gas desulfurization methods, including desulfurization of exhaust gas after combustion of fossil fuel containing sulfur gas, are classified into wet methods and dry methods. Wet methods are performed in a manner in which exhaust gas is washed with ammonia water, sodium hydroxide solution, lime liquor, etc. to remove sulfur oxide, and dry methods are conducted in a manner in which exhaust gas is brought into contact with particles or powder such as activated carbon, carbonate, etc. to adsorb or react with sulfur dioxide, thereby removing sulfur oxide.

However, flue gas desulfurization methods are problematic because a desulfurizer for treating exhaust gas has to be additionally provided, extensive labor is required and high costs are incurred for operation of the desulfurizer, and moreover the desulfurization process is complicated.

Therefore, with the goal of reducing the emission of sulfur oxide related to the combustion of fossil fuel, there is an urgent need for research into a composition for desulfurization having high desulfurization effects and a desulfurization method that may be carried out in a simple and easy manner.

CITATION LIST

Patent Literature (Patent Document 1) Korean Patent No. 10-1709864
(Patent Document 2) Korean Patent No. 10-1669310

SUMMARY OF THE INVENTION

Accordingly, the present invention has been made keeping in mind the problems encountered in the related art, and the present invention is intended to provide a catalyst for desulfurization, which may be simply and easily applied upon combustion of fossil fuel and has superior desulfurization effects, a method of preparing the catalyst for desulfurization, and a desulfurization method using the catalyst for desulfurization.

Therefore, the present invention provides a catalyst for desulfurization, comprising: (a) at least one oxide selected from the group consisting of $SiO_2$, $Al_2O_3$, $Fe_2O_3$, $TiO_2$, MgO, MnO, CaO, $Na_2O$, $K_2O$ and $P_2O_3$; (b) at least one metal selected from the group consisting of Li, Cr, Co, Ni, Cu, Zn, Ga, Sr, Cd and Pb; and (c) at least one liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$).

Also, the oxide may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$ and 5 to 20 parts by weight of $P_2O_3$, and the metal may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd and 0.003 to 0.005 parts by weight of Pb.

Also, the oxide and the metal may have a particle size of 1 to 2 μm and a specific gravity of 2.5 to 3.0.

Also, the liquid compound may include 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$) and 10 to 50 parts by weight of hydrogen peroxide ($H_2O_2$).

Also, in the catalyst for desulfurization, the oxide, the metal and the liquid compound may be formed into a metal chelate compound.

Also, the catalyst for desulfurization may activate an adsorption effect of sulfur oxide ($SO_x$) at 600 to 900° C.

In addition, the present invention provides a method of preparing a catalyst for desulfurization, comprising: (a) mixing and pulverizing at least one oxide powder selected from the group consisting of $SiO_2$, $Al_2O_3$, $Fe_2O_3$, $TiO_2$, MgO, MnO, CaO, $Na_2O$, $K_2O$ and $P_2O_3$; (b) mixing and pulverizing at least one metal powder selected from the group consisting of Li, Cr, Co, Ni, Cu, Zn, Ga, Sr, Cd and Pb; and (c) mixing the oxide of step (a) and the metal powder of step (b) with at least one liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$) to yield a catalyst for desulfurization.

Also, the oxide powder in step (a) may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$ and 5 to 20 parts by weight of $P_2O_3$.

Also, the metal powder in step (b) may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd and 0.003 to 0.005 parts by weight of Pb.

Also, the oxide powder in step (a) and the metal powder in step (b) may be pulverized to a particle size of 1 to 2 μm. Also, the liquid compound in step (c) may include 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$) and 10 to 50 parts by weight of hydrogen peroxide ($H_2O_2$).

Also, in step (c), the oxide powder, the metal powder and the liquid compound may be formed into a metal chelate compound.

Also, the catalyst for desulfurization formed in step (c) may be used in the form of a powder catalyst for desulfurization, obtained by subjecting the catalyst for desulfurization to precipitation, separation and drying, and a liquid catalyst for desulfurization, which remains after separation of the precipitated catalyst for desulfurization.

In addition, the present invention provides a desulfurization method using the above catalyst for desulfurization, comprising adsorbing and removing sulfur oxide by mixing the catalyst for desulfurization with a combustible substance and combusting the combustible substance.

Also, the amount of the catalyst for desulfurization that is mixed may be adjusted depending on the amounts of C, H, N and S of the combustible substance.

According to the present invention, a catalyst for desulfurization has a 2:1 type layered structure in which one octahedral layer is interposed between two tetrahedral layers and which has a net negative charge due to occupation of only two of three positively charged sites in the octahedral layer, and the catalyst for desulfurization is provided in the form of a metal chelate compound through chelation with a metal ion, whereby sulfur oxide ($SO_x$) can be adsorbed and removed at high efficiency upon combustion of a combustible substance.

Also, according to the present invention, the catalyst for desulfurization includes a liquid compound, which is adsorbed to ashes generated from particles of a combustible substance to thus activate porosity and reacts with sulfur oxide present in the ashes to thus remove sulfur oxide, and can thus be very effective at reducing the emission of sulfur oxide.

Also, according to the present invention, a combustible substance is mixed with the catalyst for desulfurization and then combusted, thereby obviating the need for an additional desulfurization facility and exhibiting superior applicability in a simple manner, unlike conventional methods of desulfurization of exhaust gas after combustion of fuel.

DETAILED DESCRIPTION OF THE INVENTION

Specific structural and functional descriptions of embodiments of the present invention disclosed herein are only for the purpose of illustrating the embodiments of the present invention. The present invention may be embodied in many different forms without departing from the spirit and significant characteristics of the present invention. Therefore, the embodiments of the present invention are disclosed only for illustrative purposes, and should not be construed as limiting the present invention. Hereinafter, a detailed description will be given of the present invention with reference to the accompanying drawings.

The present invention pertains to a catalyst for desulfurization, comprising (a) at least one oxide selected from the group consisting of $SiO_2$, $Al_2O_3$, $Fe_2O_3$, $TiO_2$, MgO, MnO, CaO, $Na_2O$, $K_2O$ and $P_2O_5$, (b) at least one metal selected from the group consisting of Li, Cr, Co, Ni, Cu, Zn, Ga, Sr, Cd and Pb, and (c) at least one liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$).

The catalyst for desulfurization according to the present invention may include at least one oxide selected from the group consisting of $SiO_2$, $Al_2O_3$, $Fe_2O_3$, $TiO_2$, MgO, MnO, CaO, $Na_2O$, $K_2O$ and $P_2O_5$, and preferably includes all oxides of $SiO_2$, $Al_2O_3$, $Fe_2O_3$, $TiO_2$, MgO, MnO, CaO, $Na_2O$, $K_2O$ and $P_2O_5$, as in the following embodiment.

When all of $SiO_2$, $Al_2O_3$, $Fe_2O_3$, $TiO_2$, MgO, MnO, CaO, $Na_2O$, $K_2O$ and $P_2O_5$ are included, the typical chemical formula is represented by $K_{0.8-0.9}$(Al, Fe, Mg)$_2$(Si, Al)$_4$O$_{10}$(OH)$_2$, which is a mineral called illite. Here, illite typically has a 2:1 structure, in which one octahedral layer is interposed between two tetrahedral layers and the octahedral layer has a dioctahedral structure due to occupation of only two of three positively charged sites in the binding configuration thereof with cations, thus representing a net negative charge due to the lack of cations. Thereby, when the combustible substance mixed with the catalyst for desulfurization is combusted, sulfur oxide ($SO_x$) may be adsorbed.

The catalyst for desulfurization may include, as the oxides, 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$ and 5 to 20 parts by weight of $P_2O_5$.

Also, the oxides may be mixed and pulverized to particles having a particle size of 1 to 2 μm using a pulverizer before formation into the catalyst for desulfurization, and may be used in the form of a powder having color streaks and a silvery white color, with a specific gravity of 2.5 to 3.0.

The catalyst for desulfurization according to the present invention may include at least one metal selected from the group consisting of Li, Cr, Co, Ni, Cu, Zn, Ga, Sr, Cd and Pb, and preferably includes all metals of Li, Cr, Co, Ni, Cu, Zn, Ga, Sr, Cd and Pb, as in the following embodiment.

The catalyst for desulfurization may include, as the metals, 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd and 0.003 to 0.005 parts by weight of Pb.

As in the oxides, the metals may be mixed and pulverized to particles having a particle size of 1 to 2 µm using a pulverizer, and may be used in the form of a powder having color streaks and a silvery white color, with a specific gravity of 2.5 to 3.0.

The catalyst for desulfurization according to the present invention may include at least one liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$), and preferably includes all liquid compounds of sodium tetraborate, sodium hydroxide, sodium silicate and hydrogen peroxide, as in the following embodiment.

In the catalyst for desulfurization according to the present invention, the oxide and the liquid compound are mixed and react to thus function as a chelating agent, followed by chelation through coordinate bonding with the metal, thereby forming a metal chelate compound.

Also, the liquid compound may be adsorbed to ashes formed upon combustion of a combustible substance to thus react with sulfur oxide present in the ashes to remove sulfur oxide. $NaBO_2$ is derived from sodium tetraborate $Na_2B_4O_7$, and is then hydrogenated to produce $NaBH_4$, after which the produced $NaBH_4$ reacts with oxygen and sulfur oxide to give sodium sulfate ($Na_2SO_4$), thereby removing sulfur oxide. These reactions are represented in Schemes 1 and 2 below.

$$NaBH_4 + O_3 \rightarrow Na_2O_2 + H_2O + B \quad \text{[Scheme 1]}$$

1) $Na_2O_2 + SO_3 \rightarrow Na_2SO_4 + O$

2) $Na_2O_2 + SO_2 \rightarrow Na_2SO_4$

3) $Na_2O_2 + SO \rightarrow Na_2SO_3$ [Scheme 2]

Also, the catalyst for desulfurization may include, as the liquid compounds, 20 to 130 parts by weight of sodium tetraborate, 15 to 120 parts by weight of sodium hydroxide, 50 to 250 parts by weight of sodium silicate and 10 to 50 parts by weight of hydrogen peroxide.

The catalyst for desulfurization according to the present invention is capable of activating the adsorption effect of sulfur oxide when the combustible substance is mixed therewith and combusted in the temperature range of 400 to 1200° C., but combustion in the temperature range of 600 to 900° C. may exhibit high efficiency.

In addition, the present invention pertains to a method of preparing the catalyst for desulfurization.

According to the present invention, the method of preparing the catalyst for desulfurization includes (a) mixing and pulverizing at least one oxide powder selected from the group consisting of $SiO_2$, $Al_2O_3$, $Fe_2O_3$, $TiO_2$, MgO, MnO, CaO, $Na_2O$, $K_2O$ and $P_2O_3$; (b) mixing and pulverizing at least one metal powder selected from the group consisting of Li, Cr, Co, Ni, Cu, Zn, Ga, Sr, Cd and Pb; and (c) mixing the oxide of step (a) and the metal of step (b) with at least one liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$) to yield a catalyst for desulfurization.

In step (a), at least one oxide powder selected from the group consisting of $SiO_2$, $Al_2O_3$, $Fe_2O_3$, $TiO_2$, MgO, MnO, CaO, $Na_2O$, $K_2O$ and $P_2O_3$ is mixed and pulverized using a pulverizer.

In this step, the oxide powder may contain 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$ and 5 to 20 parts by weight of $P_2O_3$.

Here, the pulverized oxide powder may be repetitively pulverized so as to have a particle size of 1 to 2 µm.

In step (b), at least one metal powder selected from the group consisting of Li, Cr, Co, Ni, Cu, Zn, Ga, Sr, Cd and Pb is mixed and pulverized using a pulverizer.

In this step, the metal powder may contain 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd and 0.003 to 0.005 parts by weight of Pb.

Here, the pulverized metal powder may be repetitively pulverized so as to have a particle size of 1 to 2 µm.

In step (c), the oxide powder mixed and pulverized in step (a) and the metal powder mixed and pulverized in step (b) are mixed with at least one liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$), thus affording a catalyst for desulfurization.

In this step, the liquid compound may contain 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$) and 10 to 50 parts by weight of hydrogen peroxide ($H_2O_2$).

Here, when the liquid compound is mixed and reacted with the oxide powder mixed and pulverized in step (a) and the metal powder mixed and pulverized in step (b), the oxide powder and the liquid compound, functioning as a chelating agent, may be chelated with the metal powder, thereby forming a metal chelate compound.

Also, the catalyst for desulfurization formed in this step may be precipitated for 24 to 72 hr and thus stabilized, and the precipitated catalyst for desulfurization is separated and naturally dried, and may thus be used as a powder catalyst for desulfurization. Further, a liquid composition, which remains after separation of the precipitated catalyst for desulfurization, may be used as a liquid catalyst for desulfurization.

In addition, the present invention pertains to a desulfurization method using the catalyst for desulfurization, in which a combustible substance is mixed with the catalyst for desulfurization and is combusted, thereby realizing desulfurization activity.

A conventional desulfurization method is performed in a manner in which sulfur oxide ($SO_x$) is removed from exhaust gas generated after the combustion of a combustible substance, and is problematic because a desulfurizer therefor has to be used and extensive labor is required and high costs are incurred for operation of the desulfurizer. However, the desulfurization method using the catalyst for desulfurization according to the present invention is performed in a manner in which a combustible substance is mixed with the catalyst for desulfurization and then combusted, whereby the catalyst for desulfurization is capable of adsorbing and removing sulfur oxide generated upon combustion of the combustible substance, ultimately exhibiting desulfurization effects for reducing the emission of sulfur oxide.

Also, examples of the combustible substance to which the catalyst for desulfurization according to the present invention may be applied may include combustibles that generate heat through combustion, such as coal, oil, waste, biogas, and the like, with coal being particularly targeted.

As described above, the catalyst for desulfurization may include a powder catalyst for desulfurization and a liquid catalyst for desulfurization, which may be used separately or together depending on the amounts of C, H, N and S of a combustible substance to be combusted, whereby superior desulfurization effects may be exhibited in a simple and easy manner.

A better understanding will be given of the present invention through the following examples and test examples.

The examples and test examples are merely set forth to illustrate the present invention but are not to be construed as limiting the scope of the present invention.

EXAMPLE 1

(1) Preparation of Catalyst for Desulfurization

As oxides, 150 kg of $SiO_2$, 150 kg of $Al_2O_3$, 100 kg of $Fe_2O_3$, 50 kg of $TiO_2$, 200 kg of MgO, 100 kg of MnO, 200 kg of CaO, 150 kg of $Na_2O$, 200 kg of $K_2O$, and 50 kg of $P_2O_3$ were mixed and pulverized using a pulverizer, thus forming an oxide powder.

As metals, 35 g of Li, 50 g of Cr, 10 g of Co, 60 g of Ni, 180 g of Cu, 350 g of Zn, 400 g of Ga, 200 g of Sr, 20 g of Cd, and 30 g of Pb were mixed and pulverized using a pulverizer, thus forming a metal powder.

The oxide powder and the metal powder were repetitively pulverized so as to have a particle size of 1 to 2 μm.

3000 kg of water was placed in a reactor, and 50 kg of sodium tetraborate ($Na_2B_4O_7 \cdot 10H_2O$) was added thereto while the temperature was maintained at 50 to 60° C. After stirring for 30 min, 100 kg of sodium hydroxide (NaOH) was added thereto and stirred. After 10 min, the pulverized oxide powder was added at intervals of 5 min in an amount of 100 kg each time, and stirred for 2 hr or more. The temperature was increased to 60 to 80° C. with stirring, and 100 kg of sodium silicate ($Na_2SiO_3$) was added thereto. Stirring was performed for 30 min, after which the pulverized metal powder was added at intervals of 3 min in an amount of 20 g each time and stirred. Stirring was performed for 1 hr, after which 30 kg of hydrogen peroxide ($H_2O_2$) was added, followed by further stirring for 30 min and natural cooling for 1 hr.

The cooled product was stabilized for 48 hr, after which the liquid composition and the precipitated powder composition were separated from each other.

The precipitated powder composition was naturally dried, thereby yielding a powder catalyst for desulfurization (GTS-P).

Also, the liquid composition separated from the precipitated powder composition was transferred into an additional vessel, thereby yielding a liquid catalyst for desulfurization (GTS-W).

(2) Preparation of Example 1 (GTS-P 3)

3 kg of the powder catalyst for desulfurization (GTS-P) obtained in (1) above was mixed with 97 kg of Russian coal, thereby producing Example 1 (GTS-P 3) containing 3 wt % of the catalyst.

EXAMPLE 2

(1) Preparation of Catalyst for Desulfurization

A powder catalyst for desulfurization (GTS-P) was prepared in the same manner as in (1) of Example 1.

(2) Preparation of Example 2 (GTS-P 5)

5 kg of the powder catalyst for desulfurization (GTS-P) obtained in (1) above was mixed with 95 kg of Russian coal, thereby producing Example 2 (GTS-P 5) containing 5 wt % of the catalyst.

EXAMPLE 3

(1) Preparation of Catalyst for Desulfurization

A liquid catalyst for desulfurization (GTS-W) was prepared in the same manner as in (1) of Example 1.

(2) Preparation of Example 3 (GTS-W 0.3)

0.3 kg of the liquid catalyst for desulfurization (GTS-W) obtained in (1) above was mixed with 99.7 kg of Russian coal, thereby producing Example 3 (GTS-W 0.3) containing 0.3 wt % of the catalyst.

EXAMPLE 4

(1) Preparation of Catalyst for Desulfurization

A liquid catalyst for desulfurization (GTS-W) was prepared in the same manner as in (1) of Example 1.

(2) Preparation of Example 4 (GTS-W 0.5)

0.5 kg of the liquid catalyst for desulfurization (GTS-W) obtained in (1) above was mixed with 99.5 kg of Russian coal, thereby producing Example 4 (GTS-W 0.5) containing 0.5 wt % of the catalyst.

COMPARATIVE EXAMPLE 100 kg of Russian coal, not mixed with the catalyst for desulfurization, was used.

TEST EXAMPLE 1

Test of $SO_2$ Emission Reduction Efficiency in DTF (1) Test Conditions

In order to verify the desulfurization efficiency of the prepared catalyst for desulfurization, the desulfurization efficiency test for analyzing and comparing exhaust gas after combustion of Comparative Example using Russian coal applied in Russian coal-fired power plants and Examples 1 to 4 using mixtures of Russian coal and the catalyst for desulfurization was performed in a DTF (Drop Tube Furnace) for evaluating the combustion characteristics of coal.

As Russian coal used in Comparative Example and Examples 1 to 4, coal from Russia was used as samples, and in order to analyze the basic characteristics of Russian coal, industrial analysis and elemental analysis were carried out by means of an industrial analyzer (TGA-701, Leco) and an elemental analyzer (Micro-Truspec CHNS, Leco). The results are shown in Table 1 below.

TABLE 1

| | Proximate analysis [wt %] as received | | as received Ultimate analysis [wt %] as daf |
|---|---|---|---|
| Moisture | 20.53 | C | 72.98 |
| Volatile matter | 31.36 | H | 7.22 |
| Fixed carbon | 33.71 | O | 14.81 |

TABLE 1-continued

|  | Proximate analysis [wt %] as received |  | as received Ultimate analysis [wt %] as daf |
|---|---|---|---|
| Ash | 14.40 | N | 0.65 |
| HHV[1] (kcal/kg) | 5,109 | S | 4.43 |

[1]HHV = 8100 * C * 0.01 + 34200 * (H * 0.01 − O * 0.01/8) + 2500 * S * 0.01 based as received Table 1 shows the results of industrial analysis and elemental analysis of Russian coal.

Russian coal was used in the form of being pulverized to 75 μm based on 200 mesh, which is the particle size used in a coal-fired power plant.

The desulfurization efficiency test of Comparative Example and Examples 1 to 4 was carried out using a 2-zone DTF, and sufficient combustion residence time was ensured under low excess oxygen conditions.

DTF operating conditions were set taking into consideration the operating conditions of the Russian coal-fired power plant. The conditions for the desulfurization efficiency test of DTF are shown in Table 2 below.

TABLE 2

| Parameter |  | Unit | Value |
|---|---|---|---|
| Excess O$_2$ |  | % | about 7 |
| Furnace temperature |  | ° C. | 1,050 |
| Coal feed rate |  | g/min | 0.01 |
| Mixing ratio | GTS-P | % wt | 3, 5 |
|  | GTS-W | % wt | 0.3, 0.5 |

Table 2 shows the DTF desulfurization efficiency test conditions.

The DTF test conditions were as follows: an excess oxygen of 7%, a combustion chamber temperature of 1,050° C. and a coal feed rate of 0.01 g/min. The results of desulfurization efficiency of Comparative Example and Examples 1 to 4 were compared.

Also, in order to evaluate the effect of the catalyst for desulfurization, a continuous combustion gas analyzer was disposed downstream of the DTF, thereby analyzing gases emitted upon combustion, such as excess O$_2$, CO, NO, SO$_2$, NO$_2$, CO$_2$, etc.

(2) Results of Measurement of Average SO$_2$ Emission

Figure 1:
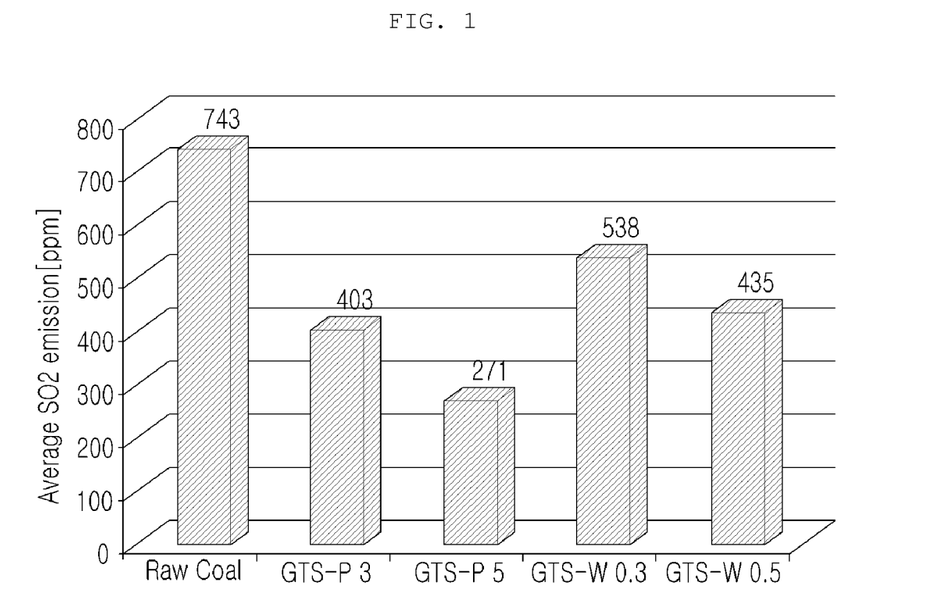
FIG. 1 shows the results of testing of average $SO_2$ emission according to an embodiment of the present invention.

FIG. 1 shows the test results of average SO$_2$ emission of Comparative Example and Examples 1 to 4, measured under test conditions of (1) above.

Average SO$_2$ emission means that the total amount of SO$_2$ emitted during the combustion of Comparative Example and Examples 1 to 4 supplied to the DTF was compared and analyzed; that is, the total amount of SO$_2$ emitted from the initial stage of the test when SO$_2$ emission is stabilized to the end stage when the coal supply is terminated, was averaged, compared and analyzed.

As shown in FIG. 1, the average SO$_2$ emission was 743 ppm in Comparative Example (Raw coal), 403 ppm in Example 1 (GTS-P 3), 271 ppm in Example 2 (GTS-P 5), 538 ppm in Example 3 (GTS-W 0.3), and 435 ppm in Example 4 (GTS-W 0.5).

The average SO$_2$ emission of Examples 1 to 4 was decreased overall compared to the average SO$_2$ emission of Comparative Example.

In particular, as the amount of the catalyst for desulfurization that was mixed was increased, the SO$_2$ emission reduction efficiency was increased. Depending on the type of catalyst, the SO$_2$ emission reduction efficiency of Examples 1 and 2 containing the powder catalyst for desulfurization was significant. However, since the mixing ratio of Examples 1 and 2 is at least 10 times as high as that of Examples 3 and 4 containing the liquid catalyst for desulfurization, the SO$_2$ emission reduction efficiency of Examples 3 and 4 containing the liquid catalyst for desulfurization is regarded as superior in consideration of the reduction efficiency based on the mixing ratio.

Figure 2:
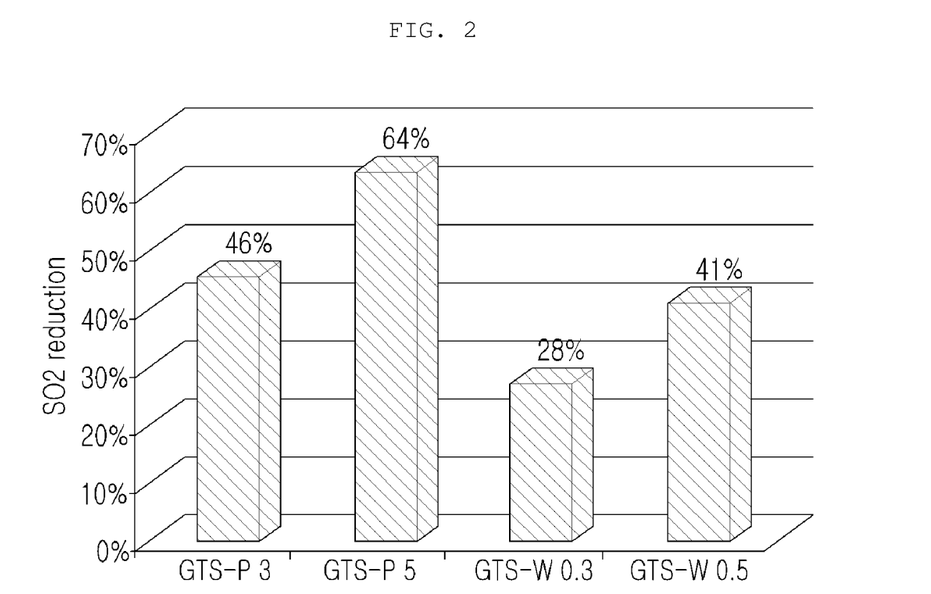
FIG. 2 shows $SO_2$ emission reduction efficiency according to an embodiment of the present invention.

FIG. 2 shows the results of SO$_2$ emission reduction efficiency relative to Comparative Example in the average SO$_2$ emission of FIG. 1, in which the SO$_2$ emission reduction efficiency was 46% in Example 1 (GTS-P 3), 64% in Example 2 (GTS-P 5), 28% in Example 3 (GTS-W 0.3), and 41% in Example 4 (GTS-W 0.5).

As shown in FIG. 2, although the coal-to-catalyst mixing ratio of Examples 3 and 4 containing the liquid catalyst for desulfurization is approximately one tenth of that of Examples 1 and 2 containing the powder catalyst for desulfurization, relatively high reduction efficiency can be found to result.

TEST EXAMPLE 2

Test of Average SO$_2$ Emission in Excess Oxygen Ranges

Figure 3:
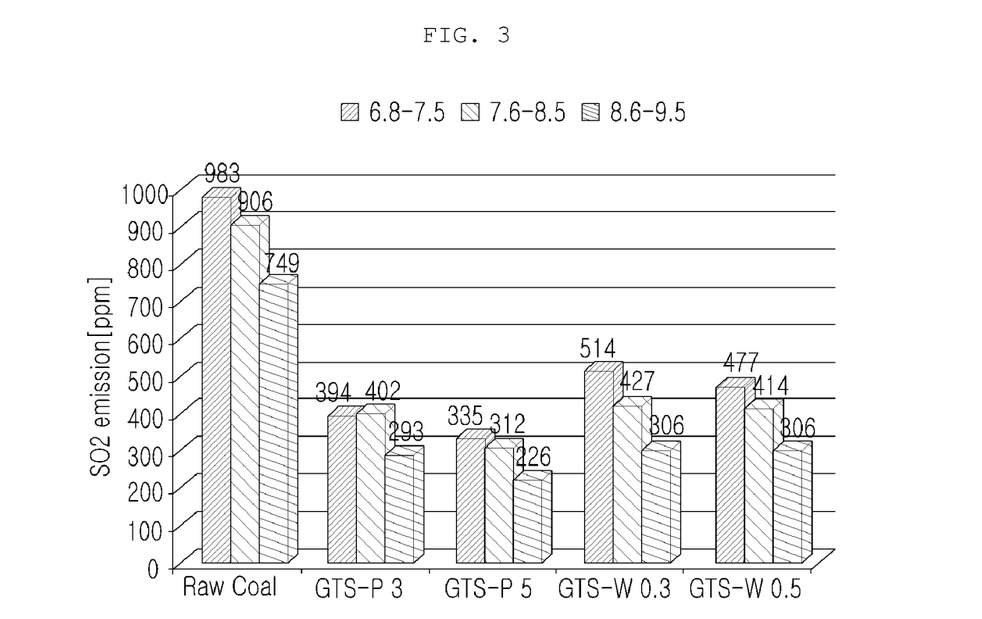
FIG. 3 shows the results of testing of average $SO_2$ emission in individual excess oxygen ranges according to an embodiment of the present invention.

FIG. 3 shows the test results of average SO$_2$ emission in individual excess oxygen ranges of Comparative Example and Examples 1 to 4.

The average SO$_2$ emission test in individual excess oxygen ranges is conducted taking into account excess oxygen conditions in an actual Russian coal-fired boiler, and means that the excess oxygen during the test in DTF is divided into predetermined ranges and the average values of SO$_2$ emission in the predetermined ranges are compared to analyze reduction efficiency. As such, analysis was carried out, except for cases of SO$_2$ emission in the presence of CO$_x$ of 100 ppm or more due to incomplete combustion or excess fuel and in the presence of NO$_x$ of 50 ppm or less due to incomplete combustion.

The minimum amount of oxygen theoretically required to completely combust a combustible substance is called the theoretical oxygen amount, and a greater amount of oxygen than the theoretical amount is supplied to the actual combustion device, and the amount of oxygen thus supplied is called the actual oxygen amount. The excess oxygen indicates the ratio of the actual oxygen amount relative to the theoretical oxygen amount.

As shown in FIG. 3, the excess oxygen ranges are classified into 6.8 to 7.5% (assuming an average of 7%), 7.6 to 8.5% (assuming an average of 8%) and 8.6 to 9.5% (assuming an average of 9%). The analysis was made considering the case where the excess oxygen changes when the combustible substance is combusted in the actual boiler. Overall, when the excess oxygen is increased, the amount of SO$_2$ that is emitted is lowered.

In Comparative Example (Raw coal), the highest SO$_2$ emission of 900 ppm was exhibited in the range of 6.8 to 7.5%, and the average SO$_2$ emission was about 300 to 400 ppm in Example 1 (GTS-P 3), about 200 to 300 ppm in Example 2 (GTS-P 5), and about 300 to 500 ppm in Example 3 (GTS-W 0.3) and Example 4 (GTS-W 0.5).

Figure 4:
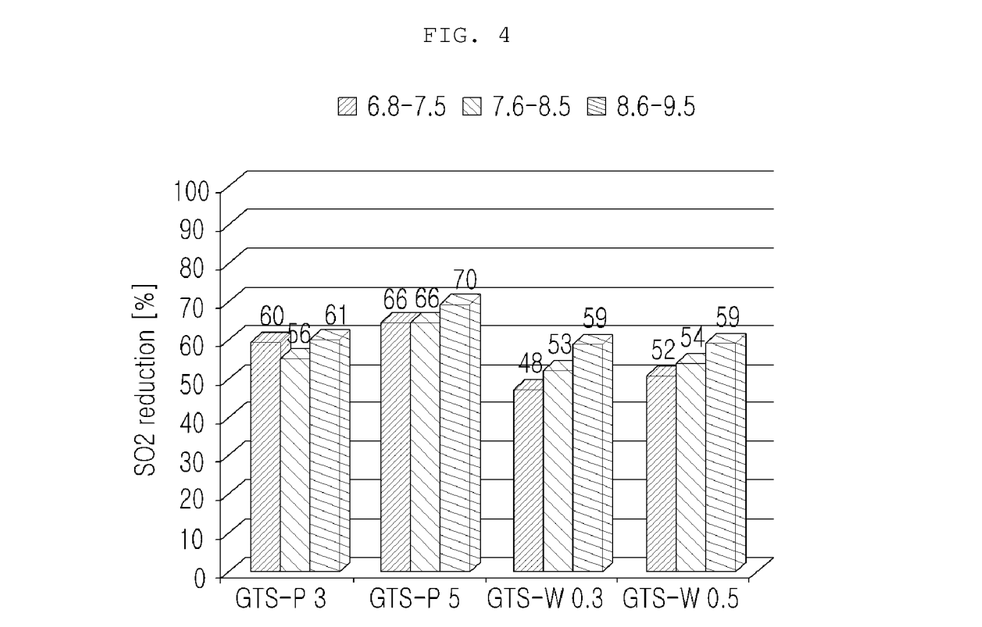
FIG. 4 shows $SO_2$ emission reduction efficiency according to an embodiment of the present invention.

FIG. 4 shows the reduction efficiency of $SO_2$ emission in the excess oxygen ranges of FIG. 3 compared to Comparative Example. In Example 1 (GTS-P 3) and Example 2 (GTS-P 5) using the powder catalyst for desulfurization, $SO_2$ reduction efficiency of about 60 to 70% was exhibited, and Example 3 (GTS-W 0.3) and Example 4 (GTS-W 0.5) using the liquid catalyst for desulfurization manifested $SO_2$ reduction efficiency of about 50 to 60%.

Figure 5:
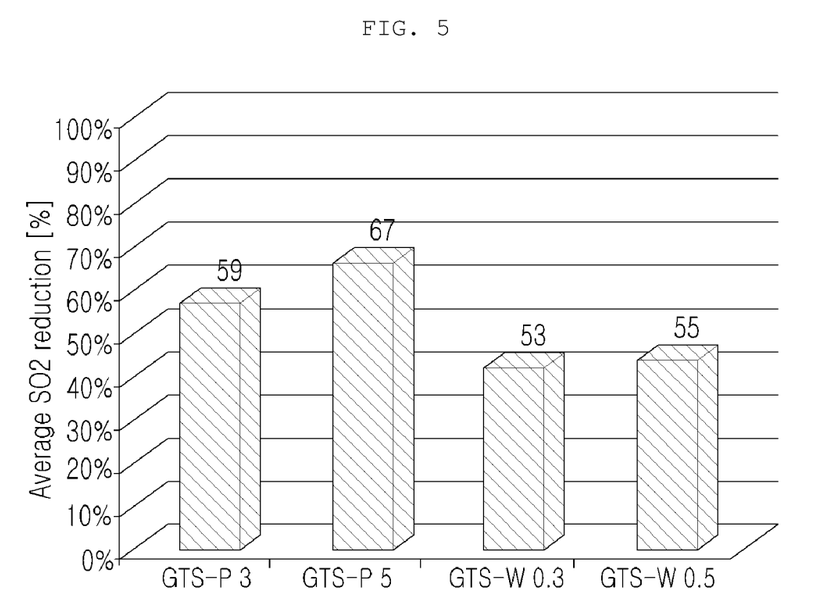
FIG. 5 shows average $SO_2$ emission reduction efficiency in the entire excess oxygen range according to an embodiment of the present invention.

FIG. 5 shows the results of average $SO_2$ emission reduction efficiency in the entire excess oxygen range, rather than the $SO_2$ emission reduction efficiency in individual excess oxygen ranges shown in FIG. 4.

As shown in FIG. 5, total $SO_2$ reduction efficiency of 50% or more was exhibited, and $SO_2$ reduction efficiency was about 60% or more in Example 1 (GTS-P 3) and Example 2 (GTS-P 5), using the powder catalyst for desulfurization, and about 50% or more in Example 3 (GTS-W 0.3) and Example 4 (GTS-W 0.5), using the liquid catalyst for desulfurization.

The $SO_2$ reduction efficiency of FIG. 5 is slightly different from the average reduction efficiency of FIG. 2, which is based on a difference in test conditions between FIGS. 2 and 5.

FIG. 2 shows the reduction efficiency based on the average total amount of overall emitted $SO_2$, and FIG. 5 shows the results of selective analysis of the amount of emitted $SO_2$ considering emission of $CO_x$ and $NO_x$ due to incomplete combustion. This indicates that the $SO_2$ emission reduction efficiency of FIG. 2 is shown in a situation in which there are changes in the excess oxygen and the combustion phenomenon when the combustible substance is combusted in the actual boiler, and also that the $SO_2$ emission reduction efficiency of FIG. 5 is shown in a situation where stable operation of the excess oxygen is possible.

TEST EXAMPLE 3

Test of Unburned Carbon Emission Upon Desulfurization Reduction Experiment

Figure 6:
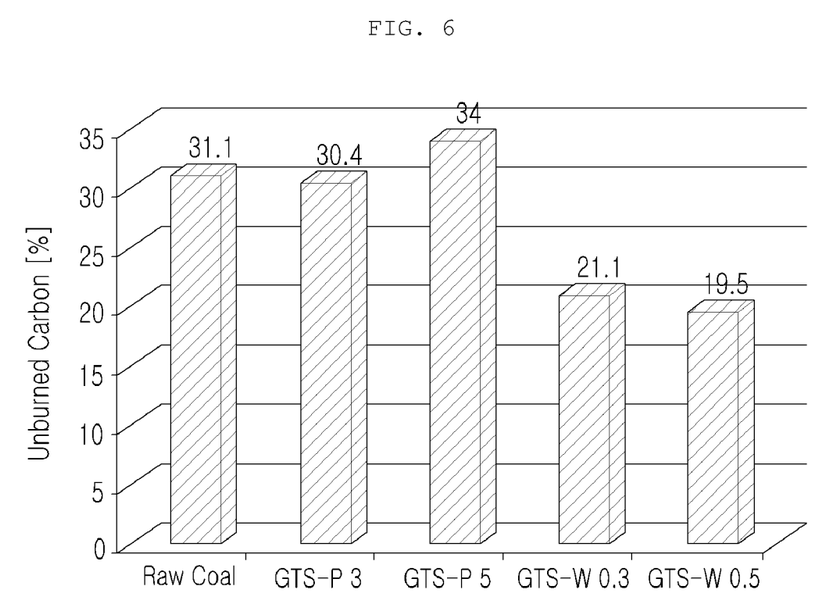
FIG. 6 shows the proportion of unburned carbon emitted from exhaust gas according to an embodiment of the present invention.

FIG. 6 shows the proportions of unburned carbon of Comparative Example and Examples 1 to 4.

The proportion of unburned carbon is regarded as a very important factor for evaluating the catalyst efficiency. The reason why sulfur oxide emission during combustion of the combustible substance is reduced is predicted to be based on whether the amount of unburned combustible substance, that is, the amount of unburned carbon, increases to thus reduce the amount of emitted sulfur oxide, or based on whether the amount of unburned carbon is constant or decreases to thus reduce the amount of emitted sulfur oxide, that is, based on the desulfurization effect of the catalyst.

As shown in FIG. 6, the proportion of unburned carbon was 31.1% in Comparative Example (Raw coal), 30.4% in Example 1 (GTS-P 3), 34% in Example 2 (GTS-P 5), 21.1% in Example 3 (GTS-W 0.3) and 19.5% in Example 4 (GTS-W 0.5).

The proportion of unburned carbon of Examples 1 and 2 was equal to or slightly greater than that of Comparative Example, which can be deemed to be due to the effect of the catalyst, rather than due to the unburned combustible substance upon combustion of the combustible substance.

Also, the proportion of unburned carbon of Example 3 (GTS-W 0.3) and Example 4 (GTS-W 0.5) using the liquid catalyst for desulfurization was lower than that of Comparative Example, from which it can be predicted that both the desulfurization effect and the combustibility-improving effect of improving the extent of combustion of the combustible substance are exhibited.

As is apparent from Test Examples 1 to 3, when the combustible substance (Russian coal, Comparative Example) is mixed with the catalysts for desulfurization of Examples 1 to 4 and then combusted, the desulfurization effect, that is, reduction efficiency ranging from 28% to 70%, was exhibited. Furthermore, as seen in Test Example 3, the reduction effect of sulfur oxide can be confirmed to be due to the actual effect of the catalyst for desulfurization, rather than due to the non-combustion of the combustible substance.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A catalyst for desulfurization, comprising:
   (a) an oxide selected from the group consisting of $SiO_2$, $Al_2O_3$, $Fe_2O_3$, $TiO_2$, $MgO$, $MnO$, $CaO$, $Na_2O$, $K_2O$ and $P_2O_3$;
   (b) a metal selected from the group consisting of Li, Cr, Co, Ni, Cu, Zn, Ga, Sr, Cd and Pb; and
   (c) a liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$),
   wherein the oxide, the metal and the liquid compound are formed into a metal chelate compound.

2. The catalyst for desulfurization of claim 1, wherein the oxide includes 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$ or 5 to 20 parts by weight of $P_2O_3$, and
   the metal includes 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd or 0.003 to 0.005 parts by weight of Pb.

3. The catalyst for desulfurization of claim 1, wherein the oxide and the metal have a particle size of 1 to 2 μm and a specific gravity of 2.5 to 3.0.

4. The catalyst for desulfurization of claim 1, wherein the liquid compound includes 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$) or 10 to 50 parts by weight of hydrogen peroxide ($H_2O_2$).

5. The catalyst for desulfurization of claim 1, wherein the catalyst for desulfurization activates an adsorption effect of sulfur oxide ($SO_x$) at 600 to 900° C.

6. A method of preparing a catalyst for desulfurization, comprising:
   (a) mixing and pulverizing an oxide powder selected from the group consisting of $SiO_2$, $Al_2O_3$, $Fe_2O_3$, $TiO_2$, MgO, MnO, CaO, $Na_2O$, $K_2O$ and $P_2O_3$;

(b) mixing and pulverizing a metal powder selected from the group consisting of Li, Cr, Co, Ni, Cu, Zn, Ga, Sr, Cd and Pb; and (c) mixing the oxide powder of step (a) and the metal powder of step (b) with a liquid compound selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$) to yield a catalyst for desulfurization, wherein the oxide powder, the metal powder and the liquid compound are formed into a metal chelate compound.

7. The method of claim 6, wherein the oxide powder in step (a) includes 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$ or 5 to 20 parts by weight of $P_2O_3$.

8. The method of claim 6, wherein the metal powder in step (b) includes 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd or 0.003 to 0.005 parts by weight of Pb.

9. The method of claim 6, wherein the oxide powder in step (a) and the metal powder in step (b) are pulverized to a particle size of 1 to 2 μm.

10. The method of claim 6, wherein the liquid compound in step (c) includes 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$) or 10 to 50 parts by weight of hydrogen peroxide ($H_2O_2$).

11. The method of claim 6, wherein the catalyst for desulfurization formed in step (c) is used in a form of a powder catalyst for desulfurization obtained by subjecting the catalyst for desulfurization to precipitation, separation and drying; and a liquid catalyst for desulfurization, which remains after separation of the precipitated catalyst for desulfurization.

12. A desulfurization method wherein the catalyst for desulfurization of claim 1, comprising adsorbing and removing sulfur oxide by mixing the catalyst for desulfurization with a combustible substance and combusting the combustible substance.

13. The desulfurization method of claim 12, wherein an amount of the catalyst for desulfurization that is mixed is adjusted depending on amounts of C, H, N and S in the combustible substance.

\* \* \* \* \*